(12) United States Patent
Bhunia et al.

(10) Patent No.: US 11,321,510 B2
(45) Date of Patent: May 3, 2022

(54) SYSTEMS AND METHODS FOR MACHINE INTELLIGENCE BASED MALICIOUS DESIGN ALTERATION INSERTION

(71) Applicant: University of Florida Research Foundation, Incorporated, Gainesville, FL (US)

(72) Inventors: Swarup Bhunia, Gainesville, FL (US); Prabuddha Chakraborty, Gainesville, FL (US); Abhishek A. Nair, Gainesville, FL (US); Tamzidul Hoque, Gainesville, FL (US); Jonathan W. Cruz, Gainesville, FL (US); Naren Masna, Gainesville, FL (US); Pravin Gaikwad, Gainesville, FL (US)

(73) Assignee: University of Florida Research Foundation, Incorporated, Gainesville, FL (US)

( * ) Notice: Subject to any disclaimer, the term of this patent is extended or adjusted under 35 U.S.C. 154(b) by 0 days.

(21) Appl. No.: 17/035,959

(22) Filed: Sep. 29, 2020

(65) Prior Publication Data
US 2021/0097220 A1    Apr. 1, 2021

Related U.S. Application Data

(60) Provisional application No. 62/908,296, filed on Sep. 30, 2019.

(51) Int. Cl.
*G06F 30/323* (2020.01)
*G06F 30/398* (2020.01)
(Continued)

(52) U.S. Cl.
CPC ............ *G06F 30/323* (2020.01); *G06F 21/55* (2013.01); *G06F 30/398* (2020.01); *G06N 20/00* (2019.01)

(58) Field of Classification Search
USPC ......................................................... 716/103
See application file for complete search history.

(56) References Cited

U.S. PATENT DOCUMENTS 9,690,933 B1 *  6/2017  Singh ..................... G06N 5/025
2020/0082083 A1 *  3/2020  Choi ..................... G06N 20/00

OTHER PUBLICATIONS

T. Inoue, K. Hasegawa, Y. Kobayashi, M. Yanagisawa and N. Togawa, "Designing Subspecies of Hardware Trojans and Their Detection Using Neural Network Approach," 2018 IEEE 8th International Conference on Consumer Electronics—Berlin (ICCE—Berlin), 2018, pp. 1-4, doi: 10.1109/ICCE-Berlin.2018.8576247.*

(Continued)

*Primary Examiner* — Bryce M Aisaka
(74) *Attorney, Agent, or Firm* — Alston & Bird LLP

(57) ABSTRACT

Embodiments of the present disclosure provide methods, apparatus, and computer program products for generating an insertion netlist for a target circuit configured for inserting a malicious design alteration into the circuit based on a design identifying reference trigger nets. Features are extracted for each net identified in a netlist for the circuit. A set of reference trigger features is generated for each of the reference trigger nets. A net is selected from the netlist for each set of reference trigger features based on a similarity between the features of the net and the set of reference trigger features. The insertion netlist is generated that includes the circuit with the malicious design alteration inserted at each of the selected nets.

24 Claims, 12 Drawing Sheets

(51) Int. Cl.
*G06F 21/55* (2013.01)
*G06N 20/00* (2019.01)

(56) References Cited

OTHER PUBLICATIONS

Cruz, Jonathan et al. *An Automated Configurable Trojan Insertion Framework for Dynamic Trust Benchmarks.* In 2018 Design, Automation & Test in Europe Conference & Exhibition (Date) Mar. 19, 2018, (pp. 1598-1603). IEEE.

* cited by examiner

700

| Machine Intelligence based Trojan Insertion |
|---|
| Input : TargetNetlist (C), |
| Generative Models (GMTr, GMP), |
| TrojanNetlist (T) |
| Output: TrojanInsertedNetlist (TC), |
| TrojanReports (TR) |

1 procedure insertTrojan (C, T, GMTr, GMP, TC, TR);
2 $circuitGraph$ = createGraph(C)
3 $trojanGraph$ = createGraph(T)
4 foreach edge $\in circuitGraph$ do
5    compute edge features
6 end
7 $numTrigger = trojanGraph.numTrigger$
8 $netlist = circuitGraph.edges$
9 $referenceTriggers$ = sample( GMTr, $numTrigger$ )
10 $referencePayload$ = sample( GMP , 1 )
11 $potentialPayloads$ = sort($netlist, referencePayload$)
12 $payload = potentialPayloads[0]$
13 foreach $reftrigger \in referenceTriggers$ do
14    $potentialTriggers$.append( sort($netlist, reftrigger$) )
15 end
16 repeat
17    repeat
18       foreach triggerlist $\in potentialTriggers$ do
19          index = random(1, THRESHOLD1)
20          triggerlist[index] $\cup$ $triggers$
21       end
22    until $\sum index$ < THRESHOLD2;
23 until validTrojan(triggers) == TRUE;
24 TC = mergeGraph( trojanGraph, circuitGraph, triggers, payload )
25 TR = printReport( triggers, payload )
26 return TC, TR

FIG. 7

SYSTEMS AND METHODS FOR MACHINE INTELLIGENCE BASED MALICIOUS DESIGN ALTERATION INSERTION

CROSS-REFERENCE TO RELATED APPLICATIONS

This application claims the benefit of U.S. Provisional Patent Application Ser. No. 62/908,296, filed Sep. 30, 2019, which is incorporated herein by reference in its entirety, including any figures, tables, and drawings.

TECHNICAL FIELD

The present application relates to identifying a position within an integrated circuit (IC) for inserting a malicious design alteration.

BACKGROUND

Hardware Trojans are hidden malicious modification of circuitry that can be introduced at various stages of the manufacturing flow of modern ICs. These circuits can be placed in the IC design (e.g., the intellectual property (IP)) to cause a functional failure or information leakage. Malicious circuits can be tailored to get activated only at a rare condition that occurs through the application of specific input vectors to the Trojan inserted IP/IC. Hence, an optimized set of test vectors generated for the assessment of functional correctness or fault detection is not often able to activate hardware Trojans. Hardware Trojans can also be designed to trigger at a unlikely operational condition (e.g., high temperature). Further, rare activation may not even be required if the Trojan is designed to impact the performance of the IC instead of its functionality. The circuit can be placed so as to gradually degrade the reliability of the device or continuously leak information through a side-channel causing a subtle parametric impact that can go unnoticed.

Generally, hardware Trojans are modelled as a trigger and a payload circuit (e.g., payload) where the trigger activates the payload when specific trigger input is received. For instance, an original signal driven by an OR gate can be modified by an adversary such that it passes through a malicious payload and propagates as a modified signal to the rest of the design appearing as the original signal. Here, the malicious payload may be activated by a trigger circuit implemented using an AND gate, and hence, activates when two inputs become logic high simultaneously. Upon activation, relation between the original signal and the modified signal becomes inverted and functionality of the design gets corrupted. A trigger could also be designed using sequential circuits, such as a counter and finite state machine (FSM). In some instance, a trigger circuit may not be required for an always-on leakage Trojan that leaks information through the side-channel by causing specific switching activity.

The threat of hardware Trojans has become increasingly serious as modern electronic supply chain relies on several different vendors that specialize in a particular area of the design and fabrication process. Today, most of the design houses source their hardware IP cores from various third-party IP vendors and manufacture them in external foundries. However, this distributed manufacturing system falls prey to the assumption that the underlying hardware base can be trusted as any of these third-party entities can introduce additional circuitry within the hardware design to circumvent/degrade the device's performance during field operation.

This problem has garnered the attention of researchers who have proposed several techniques for detecting, disabling, and/or removing hardware Trojans. However, a fair and comprehensive assessment of countermeasures oftentimes requires a large number of unbiased hardware Trojan examples that possess the properties of the assumed model of the threat. The standard has been to use a limited number of Trojan benchmarks (e.g., Trojan inserted IPs) across different abstraction levels (register-transfer-level, gate-level, etc.). However, such a limited number of static benchmarks do not provide the platform for a comprehensive assessment as they only encompass a small subset of the vast design space for different classes of Trojans. Additionally, static benchmarks have inherent bias due to fixed locations and quality. As a result, researchers can inadvertently tune their detection techniques to only be valid for a small number of available Trojans. Moreover, application of supervised machine learning techniques for verification typically requires a large number of Trojan examples with varied functional and structural parameters for training.

For example, an effort detailed in an article "[a]n automated configurable Trojan insertion framework for dynamic trust benchmarks," J. Cruz, Y. Huang, P. Mishra, and S. Bhunia, in 2018 *Design Automation & Tests in Europe Conference & Exhibition (DATE)*, IEEE, 2018, pp. 1598-1603 showcases the need for dynamic trust benchmarks and outlines a methodology for automatically inserting hardware Trojans in gate-level IPs. Accordingly, a suite of one thousand Trojan inserted gate-level benchmarks generated by this tool have been made available. While a step in the right direction, there remains several opportunities to advance previous approaches. Upon receiving a new Trojan model, existing tools typically place the Trojans randomly without considering other important features which may contribute to the stealthy nature of the new Trojan. While difficult activation is an important feature for hard-to-trigger Trojans, other functional features such as switching activity and control-value, along with structural features like distance from primary input/output are also important to ensure that the inserted Trojans depict the structural and functional behavior of the assumed Trojan model. Depiction of a particular Trojan model is valuable for proliferated generation of Trojan designs that can bypass one or more countermeasures.

Thus, in light of the above, Applicant has identified a number of deficiencies and problems associated with generating Trojan benchmarks. Through applied effort, ingenuity, and innovation, many of these identified deficiencies and problems have been addressed by developed solutions included in various embodiments of the present disclosure, many examples of which are described in detail herein.

BRIEF SUMMARY

Embodiments of the present disclosure provide methods, apparatus, systems, computer program products and/or the like for generating an insertion netlist for a target circuit configured for inserting a malicious design alteration into the target circuit based on a malicious design identifying one or more reference trigger nets for the malicious design alteration. For example, in particular embodiments, the malicious design alteration may be a hardware Trojan. In accordance with one aspect of the present disclosure, a method for generating an insertion netlist for a target circuit configured for inserting a malicious design alteration into the target circuit based on a malicious design identifying one or more reference trigger nets for the malicious design alteration is provided. In various embodiments, the method comprises: extracting one or more features for each of one or more nets identified in a netlist for the target circuit; generating a set of reference trigger features for each of the one or more reference trigger nets identified in the malicious design by using a machine learning trigger model; selecting a selected trigger net from the one or more nets found in the netlist for the target circuit based on a similarity between the one or more features of the selected trigger net and the set of reference trigger features; and generating the insertion netlist comprising the target circuit with the malicious design alteration inserted into the target circuit at each of the selected trigger nets.

In accordance with another aspect of the present disclosure, an apparatus is provided. In various embodiments, the apparatus comprises at least one processor and at least one memory comprising computer program code. The at least memory and the program code are configured to, with the at least one processor, cause the apparatus to: extract one or more features for each of one or more nets identified in a netlist for the target circuit; generate a set of reference trigger features for each of the one or more reference trigger nets identified in the malicious design by using a machine learning trigger model; for each of the sets of reference trigger features, select a selected trigger net from the one or more nets found in the netlist for the target circuit based on a similarity between the one or more features of the selected trigger net and the set of reference trigger features; and generate the insertion netlist comprising the target circuit with the malicious design alteration inserted into the target circuit at each of the selected trigger nets.

In accordance with yet another aspect of the present disclosure, a non-transitory computer storage medium is provided. In various embodiments, the non-transitory computer storage medium comprises instructions stored thereon. The instructions being configured to cause one or more processors to at least perform operations configured to: extract one or more features for each of one or more nets identified in a netlist for the target circuit; generate a set of reference trigger features for each of the one or more reference trigger nets identified in the malicious design by using a machine learning trigger model; for each of the sets of reference trigger features, select a selection trigger net from the one or more nets found in the netlist for the target circuit based on a similarity between the one or more features of the selected trigger net and the set of reference trigger features; and generate the insertion netlist comprising the target circuit with the malicious design alteration inserted into the target circuit at each of the selected trigger nets.

Accordingly, in particular embodiments, the malicious design may identify one or more reference payload nets for the malicious design alteration. In these particular embodiments, a set of reference payload features may be generated for each of the one or more reference payload nets identified in the malicious design by using a machine learning payload model and for each of the sets of reference payload features, a selected payload net is selected from the one or more nets found in the netlist for the target circuit based on a similarity between the one or more features of the selected payload net and the set of reference payload features. Here, the insertion netlist may include the target circuit with the malicious design alteration inserted into the target circuit at each of the selected trigger nets and each of the selected payload nets.

In addition, in particular embodiments, the machine learning trigger model and the machine learning payload model each comprise a generative machine-based learning model that is trained on features extracted from a plurality of trigger nets and a plurality of payload nets for a plurality of malicious design alteration examples. Further, in particular embodiments, the one or more features for each of the one or more nets identified in the netlist for the target circuit include at least one of one or more functional features related to functional behavior of the net and one or more structural features describing location and connectivity of the net.

In some embodiments, a hypergraph representation of the netlist for the target circuit is generated and the one or more features for each of the one or more nets identified in the netlist are extracted by calculating the one or more structural features through use of at least one of a breadth-first search graph traversal algorithm and a depth-first search graph traversal algorithm on the hypergraph representation. In addition, in some embodiments, the selected trigger net is selected for each of the sets of reference trigger features by generating a sorted trigger list comprising the one or more nets found in the netlist for the target circuit for each of the sets of reference trigger features, wherein the sorted trigger list includes the one or more nets sorted in order based on a similarity between the one or more features for a net of the one or more nets and the set of reference trigger features, and randomly selecting one of the one or more nets from the sorted trigger list as the selected trigger net for each sorted trigger list based on the selected trigger net being ordered in the sorted trigger list within a first threshold. Further, in some embodiments, the selected trigger nets are validated based on the nets being able to achieve a combination of values required to activate the malicious design alteration. Finally, in some embodiments, the similarity between the one or more features of a selected trigger net and the set of reference trigger features is based on a distance between the one or more features of the selected trigger net and the set of reference trigger features.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

FIG. 1 provides an overview of a framework for generating malicious design alteration benchmarks in accordance with various embodiments of the present disclosure;

Figure 4:
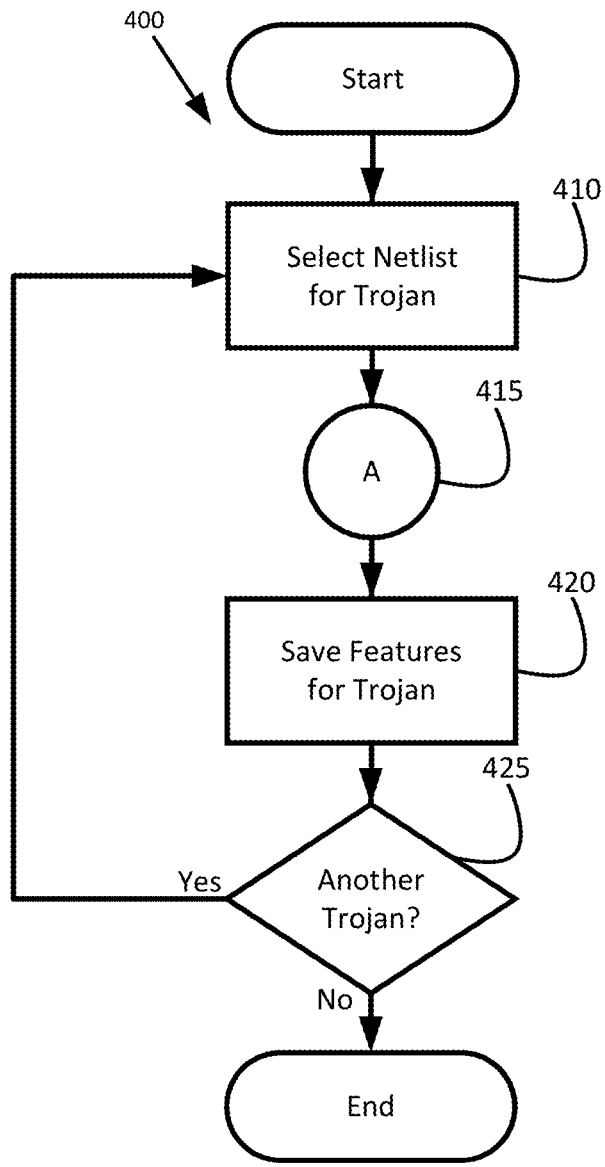
Figure 5:
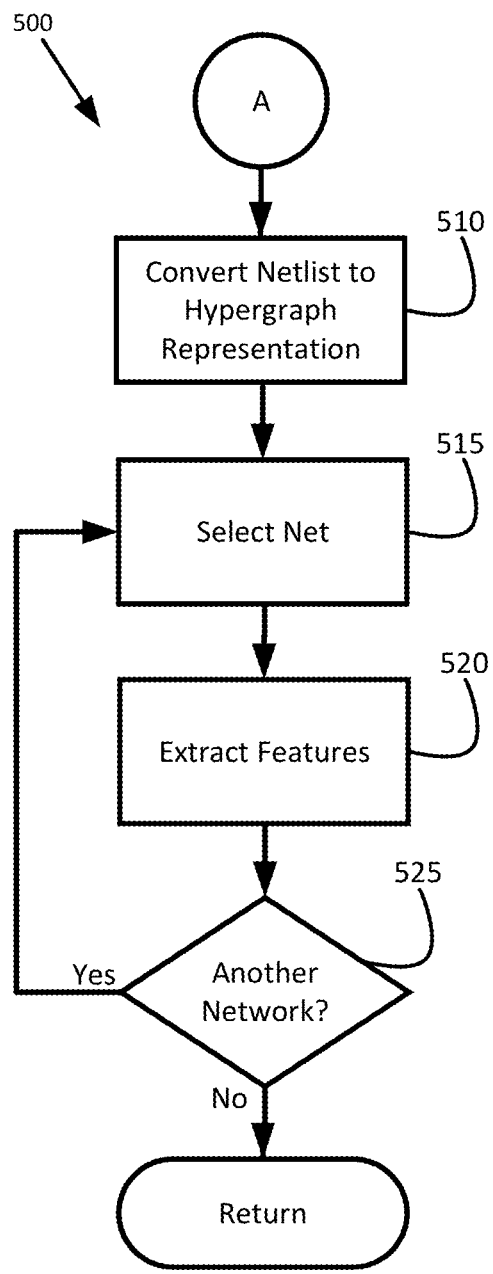
Figure 6:
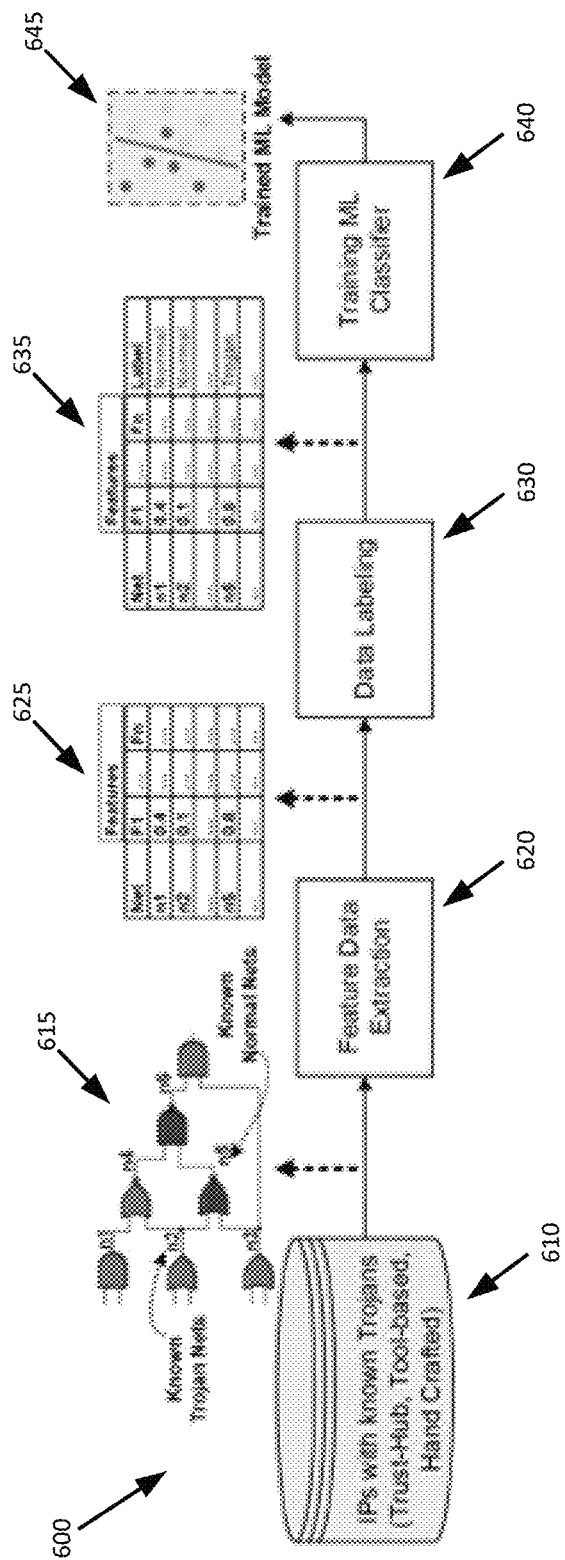
Figure 8:
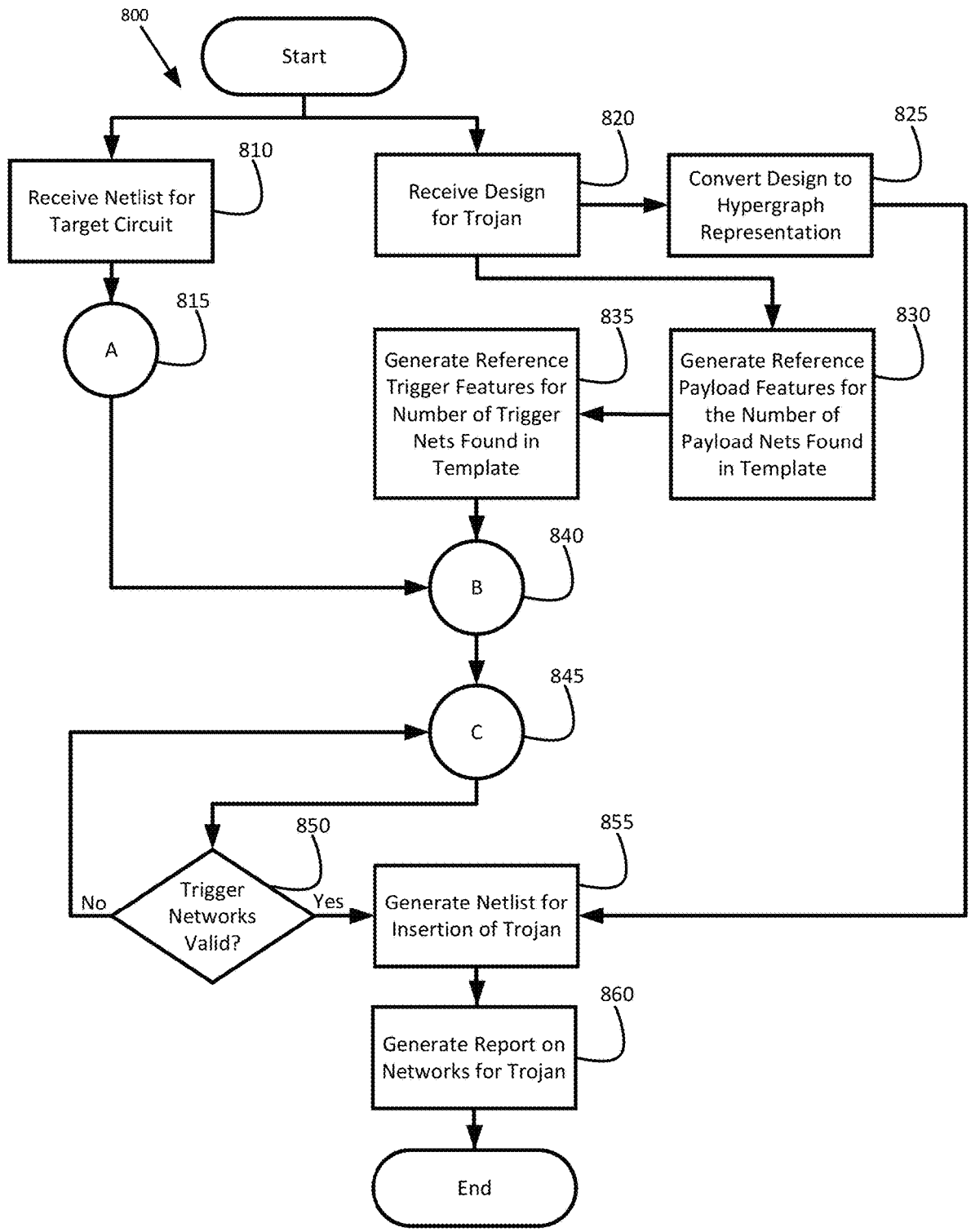
Figure 9:
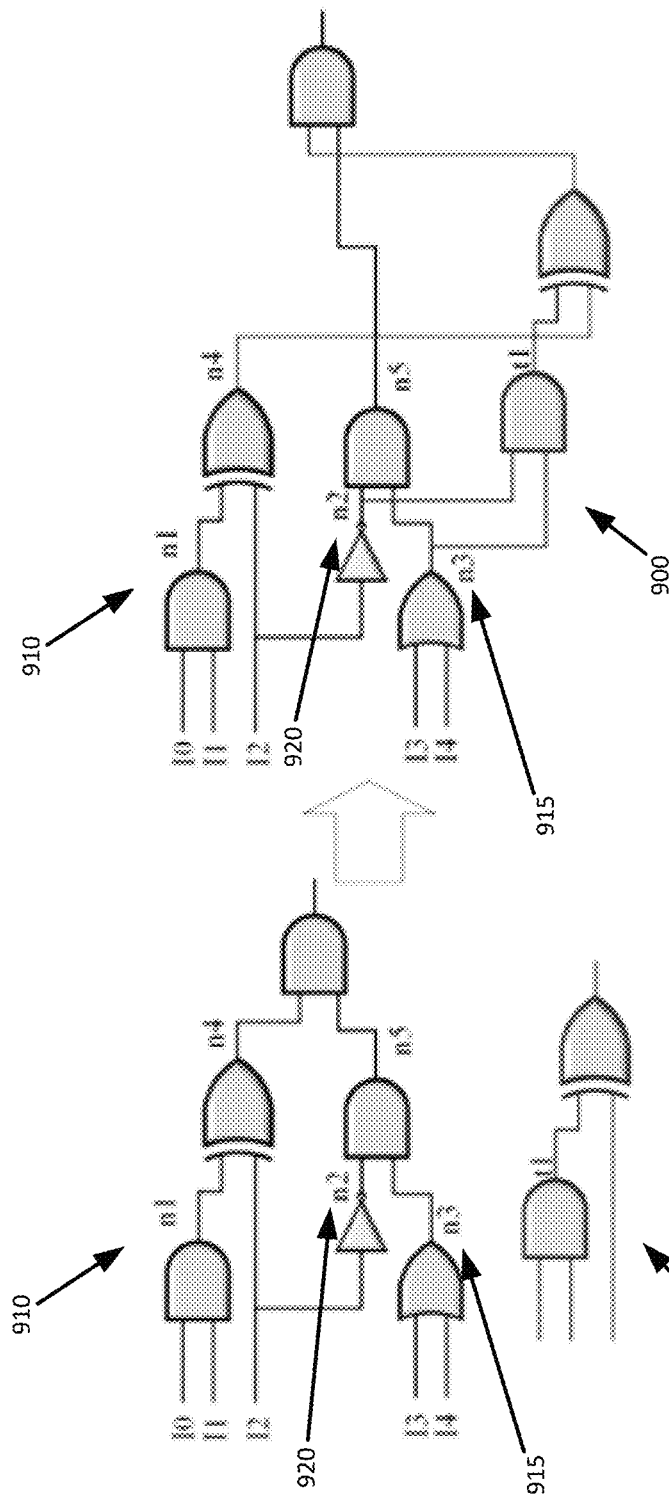
Figure 10:
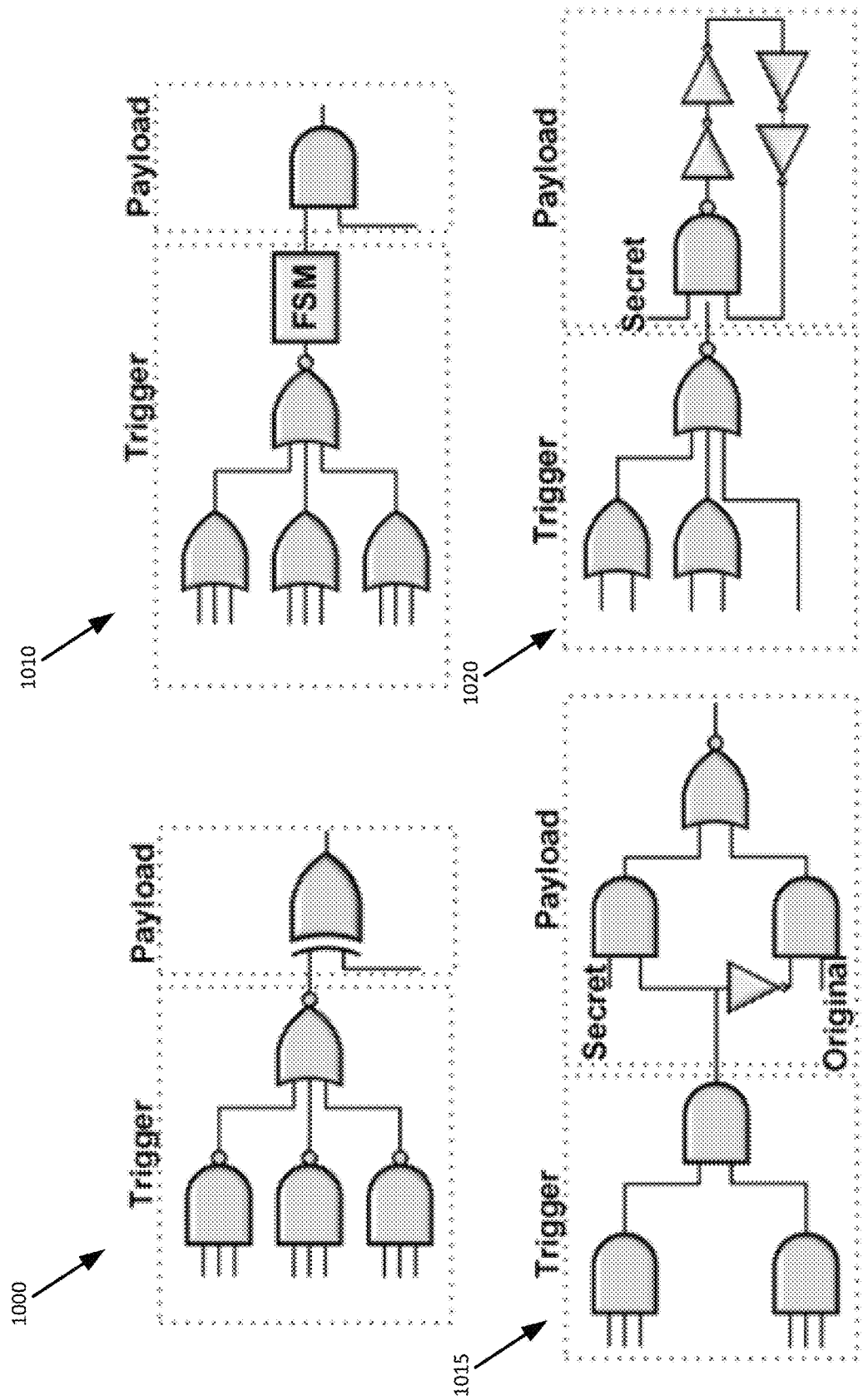
Figure 11:
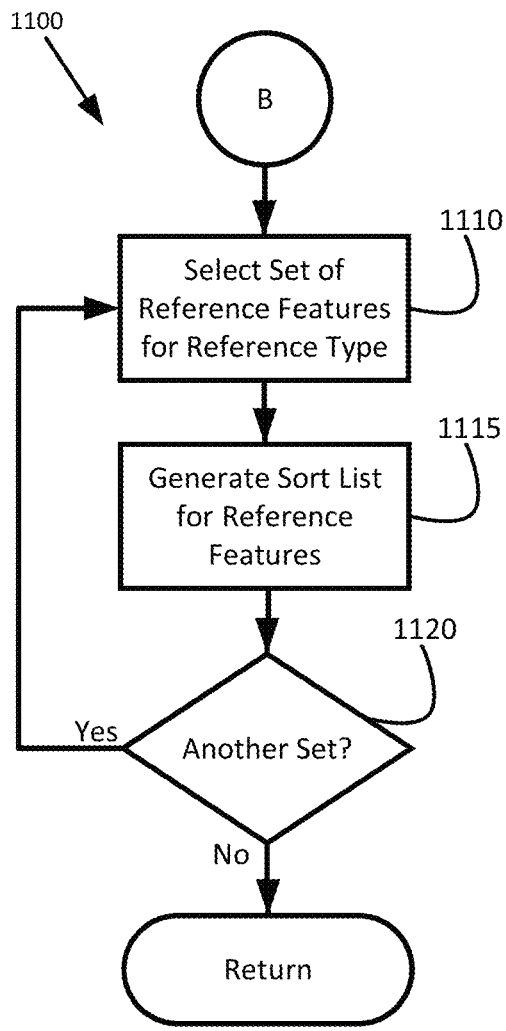
Figure 12:
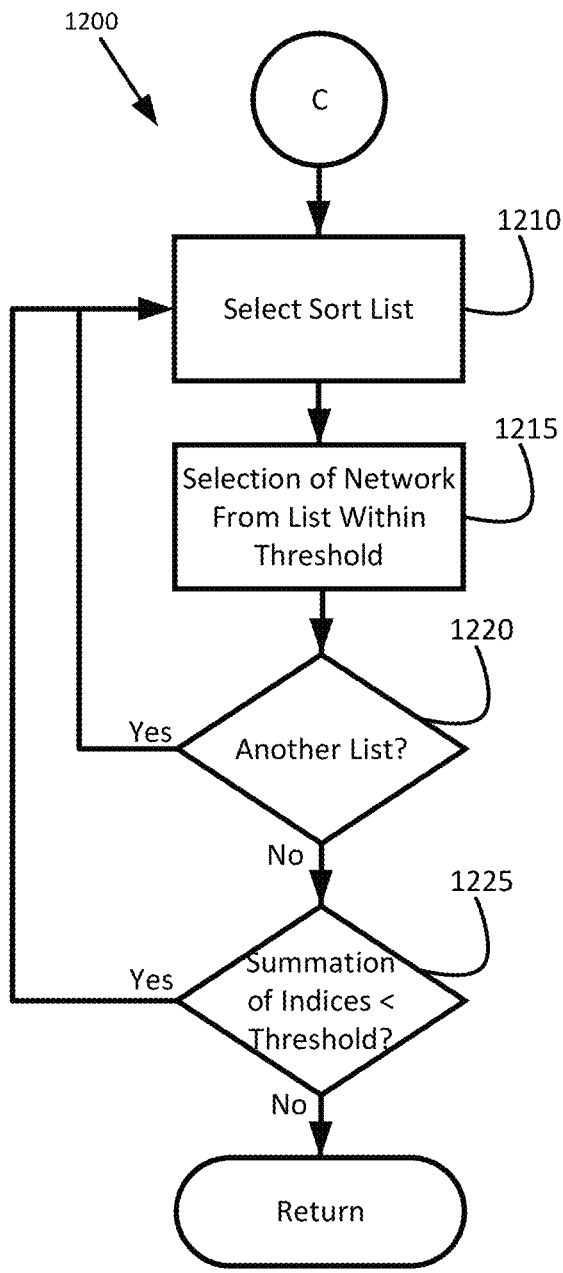

FIG. 4 provides a process flow for generating training data from examples of Trojans in accordance with various embodiments of the present disclosure;

FIG. 5 provides a process flow for extracting features from nets in accordance with various embodiments of the present disclosure;

FIG. 6 provides a process for training machine learning models for use in accordance with various embodiments of the present disclosure;

FIG. 7 provides a process for generating an insertion netlist for a target circuit configured for inserting a malicious design alteration into the target circuit in accordance with various embodiments of the present disclosure;

FIG. 8 provides a process flow for generating an insertion netlist for a target circuit configured for inserting a malicious design alteration into the target circuit in accordance with various embodiments of the present disclosure;

FIG. 9 provides an example of insertion of a Trojan into a target circuit in accordance with various embodiments of the present disclosure;

FIG. 10 provides examples of Trojan templates that may be used in accordance with various embodiments of the present disclosure;

FIG. 11 provides a process flow for sorting nets found in a netlist for a target circuit in accordance with various embodiments of the present disclosure; and FIG. 12 provides a process flow for identifying nets found in a target circuit for trigger and payload nets needed for a Trojan to be inserted into the target circuit in accordance with various embodiments of the present disclosure.

DETAILED DESCRIPTION OF VARIOUS EMBODIMENTS

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents. The following brief definition of terms shall apply throughout the application.

The term "comprising" means including but not limited to, and should be interpreted in the manner it is typically used in the patent context. The phrases "in one embodiment," "according to one embodiment," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment). If the specification describes something as "exemplary" or an "example," it should be understood that refers to a non-exclusive example; The terms "about" or "approximately" or the like, when used with a number, may mean that specific number, or alternatively, a range in proximity to the specific number, as understood by persons of skill in the art field.

If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

General Overview of Various Embodiments

Figure 1:
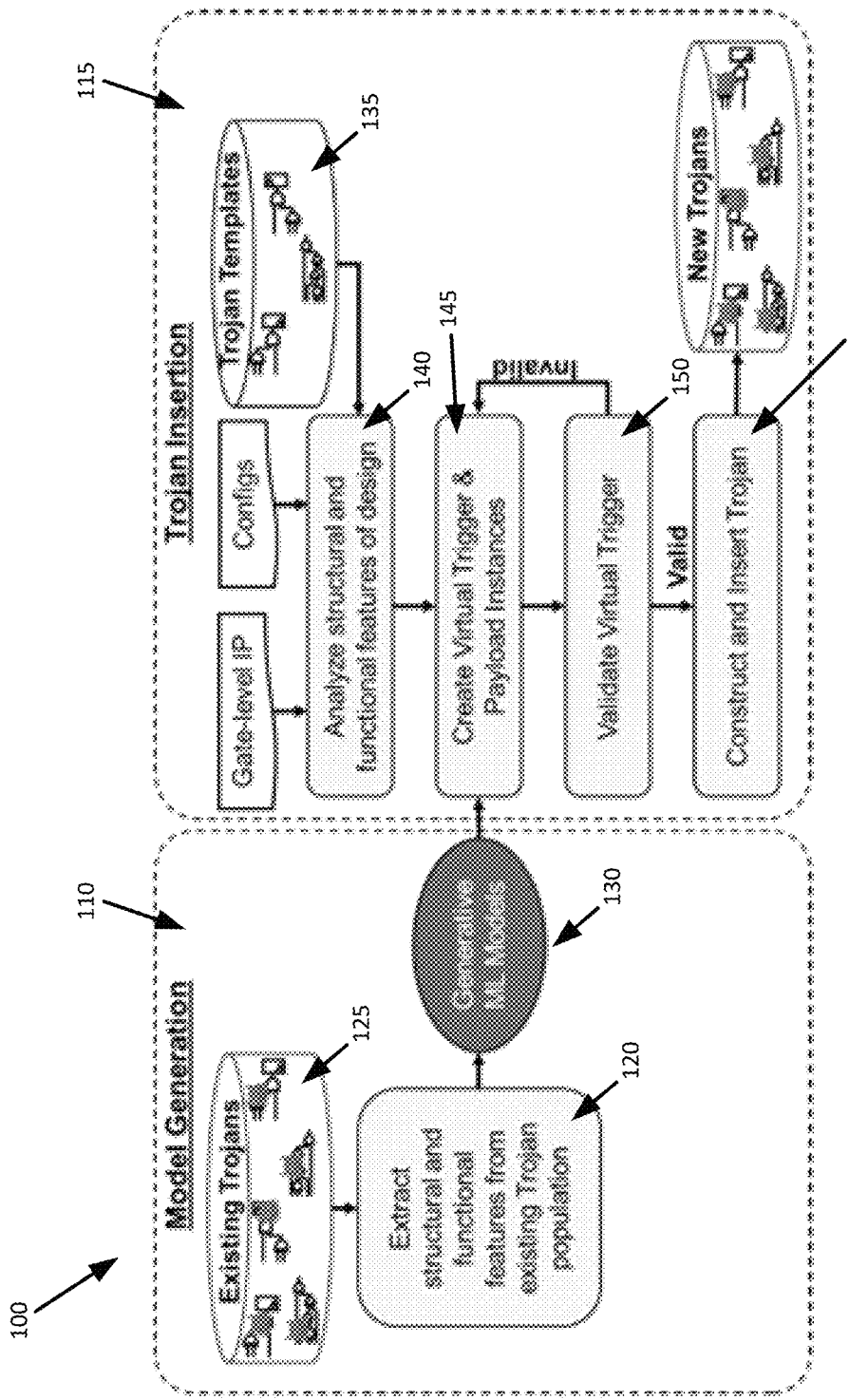

The present disclosure is directed to a machine learning-based tool for generating malicious design alteration benchmarks that overcomes the aforementioned challenges and more. An overview of the framework 100 according to various embodiments is shown in FIG. 1. The present disclosure provides for analysis of existing malicious design alteration Trojan populations and development and training of machine learning models. The trained model(s) can then be used in designing new Trojan benchmarks for target circuits.

It will be appreciated that "Trojan," "hardware Trojan," and "malicious design alteration" are used herein interchangeably. It will also be appreciated that, while embodiments herein describe malicious design alteration insertion into target circuitry, the present disclosure relates to malicious design alteration insertion for any hardware intellectual property, including cryptoprocessors, communication protocols, mixed signal, digital signal processing, analog, and the like. Accordingly, such applications are within the scope of the present disclosure.

Various embodiments of the present disclosure divide the generation framework 100 into two phases: 1) trigger and payload model generation 110 and 2) Trojan insertion 115. It is noted that "Trojan insertion," "inserting a Trojan," and/or the like used herein involves identifying a design (e.g., generating an insertion netlist) in various embodiments for inserting a Trojan into a target circuit. For training, various embodiments involve extracting features 120 from a pool of existing Trojans 125 and producing machine learning (ML) models 130 for Trojan trigger and payload networks (nets). Particular embodiments make use of a netlist (e.g., a flattened Verilog netlist) for the target circuit to insert Trojans. Accordingly, in various embodiments, Trojan insertion 115 involves obtaining a sampling of a representative model of trigger and payload nets from the respective machine learning model 130 and analyzing (e.g., comparing) 140 the representative model of trigger and payload nets against features extracted from all the nets in the target circuit design. A similarity (e.g., fitness) between the model and extracted features is determined for every net and the nets in the target design with features that have a sufficient similarity to the model features (e.g., a distance between features being below a certain threshold) being selected as candidate nets to create virtual trigger and payload instances 145. While embodiments select a set of nets based on the similarity of their extracted features to the model features (e.g., fitness), in some instances the set of nets may not simultaneously achieve all rare values or form an unintended combinational loop, creating an invalid Trojan. Therefore, various embodiments also involve verifying the set of nets both functionally and structurally to ensure only valid Trojans are inserted 150. Finally, various embodiments involve combining the nets with a Trojan design selected from a library of template designs 135 or generated from user-provided inputs to identify where in a netlist for the target circuit 155 to insert the Trojan. Accordingly, in particular embodiments, several configurations can be exposed to the user to control the type of Trojan, feature weights, and model used during insertion.

An advantage realized over previous approaches in various embodiments is the framework can learn from an existing Trojan population and extract a multi-dimensional feature space that includes structural and functional features from nets in a netlist (e.g., gate level netlist). In this way, the framework is attempting to mimic an intelligent attacker and consider several qualities that contribute to low detectability of stealthy Trojans. Specifically, in particular embodiments, the framework builds one or more generative machine learning models from which new Trojans of similar quality to the original population can be generated for insertion. A key advantage realized in various embodiments of the framework over current tools is that the framework can be informed by all the Trojans present in the population. Therefore, Trojans generated using the framework can automatically adapt in response to new Trojan discoveries in the wild. In addition, the flexibility of the framework in particular embodiments enables users to control the number and type of Trojans inserted. Different Trojans types (e.g., combinational, and sequential) often have different or even conflicting features. Therefore, the framework in various embodiments allows users to also control feature weights along with the machine learning model(s) used for Trojan insertion allowing for more representative modeling.

Thus, the framework in various embodiments provides machine learning model(s) that can evolve with evolution of the existing Trojan population due to the discovery of newer and more sophisticated Trojans and retraining of the model(s) accordingly. Therefore, the dynamic nature of the present disclosure provides for constant adaptation in various embodiments to newer Trojan binding policies and keeping up with rapidly evolving attackers. This can provide significant improvements over conventionally static-based approaches. Further, in particular embodiments, the model(s) can also be trained using different Trojan taxonomies or using different host hardware intellectual properties.

Areas in which various embodiments of the disclosure may be used include as an unbiased coverage estimation for a trust verification engine. Here, use of the generated benchmarks may enable unbiased coverage estimation for any IP or IC trust verification system. In addition, as a powerful IP trust verification tool in that the framework of various embodiments allows for the generation of effective and/or targeted training data that can be used for the development of powerful machine learning based IP trust verification frameworks. Such frameworks can allow for designers to analyze functional and parametric behavior with analytics per IP to identify any malicious changes. Further, inclusion of automated benchmarking provided in various embodiments can enable trust to be incorporated throughout the design flow. A design can be tested for Trojan vulnerabilities at different stages of this life-cycle and as a result, designers can subsequently modify their designs accordingly. Finally, automated intelligent Trojan benchmarking as provided in various embodiments can enable use of big data analytics by creating a large number of Trojan instances per IP.

Computer Program Products, Systems, Methods, and Computing Entities

Embodiments of the present disclosure may be implemented in various ways, including as computer program products that comprise articles of manufacture. Such computer program products may include one or more software components including, for example, software objects, methods, data structures, and/or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of a data structure, apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically configured machines performing the steps or operations specified in the block diagrams and flowchart illustrations. Accordingly, the block diagrams and flowchart illustrations support various combinations of embodiments for performing the specified instructions, operations, or steps.

Exemplary System Architecture

A system architecture that can be used in accordance with various embodiments of the present disclosure is now described that may include any of a variety of devices. For example, the architecture may include a networked device (e.g., an enterprise platform) configured to communicate with one or more devices, such as one or more client devices. Although a stand-alone device may be used in various embodiments. Accordingly, the networked device and/or client devices may include computing devices, such as a server, a personal computer, a computer workstation, a terminal device, and/or the like. In addition, such devices may include a variety of mobile devices, such as a portable digital assistant (PDA), mobile telephone, smartphone, laptop computer, tablet computer, wearable, or any combination of the aforementioned devices.

Figure 2:
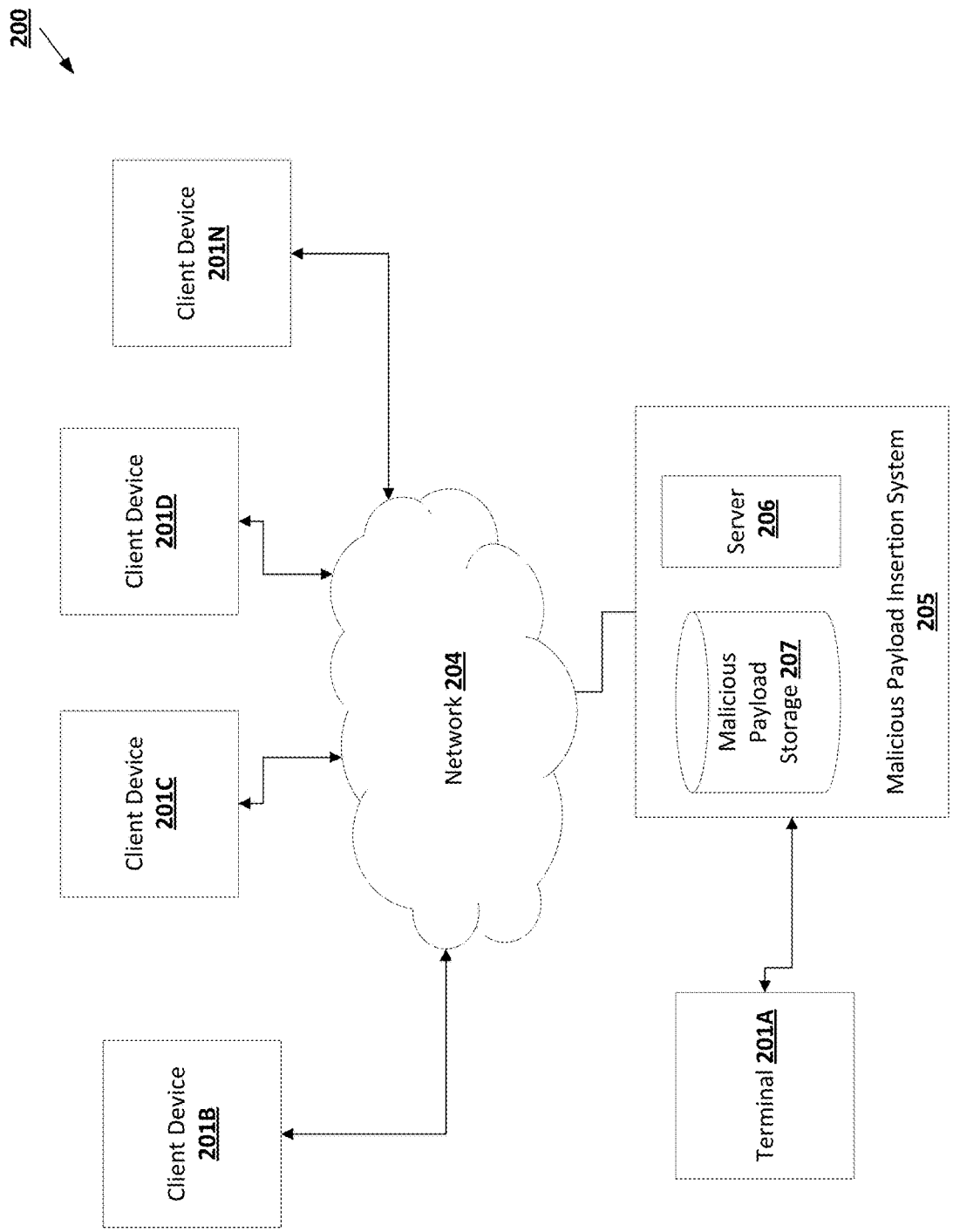
FIG. 2 is a schematic of a system architecture that may be used in accordance with various embodiments of the present disclosure.

FIG. 2 illustrates an example system architecture that may be used in accordance with various embodiments of the present disclosure. Users may access a malicious design alteration insertion system 205 either directly from a terminal 201A or via one or more communication networks 204 using any of a variety of client devices 201B-201N. The malicious design alteration insertion system 205 may include one or more servers 206 in communication with one or more existing malicious design alteration storage devices 207.

The communication network(s) 204 may include any one or a combination of different types of suitable communication networks such as, for example, cable networks, public networks (e.g., the Internet), private networks (e.g., frame-relay networks), wireless networks, cellular networks, telephone networks (e.g., a public switched telephone network), or any other suitable private and/or public networks. Further, these networks may have any suitable communication range associated therewith and may include, for example, global networks (e.g., the Internet), metropolitan area networks (MANs), wide area networks (WANs), local area networks (LANs), or personal area networks. In addition, the networks may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms provided by network providers or other entities.

The one or more servers 206 may be configured for receiving electronic data from various sources, including but not necessarily limited to the terminal or client devices 201A-201N. For example, the server(s) 206 may be operable to receive communications in the form of malicious design alteration insertion requests provided by the terminal or client devices 201A-201N. The server(s) 206 may also transmit communications in the form of netlists comprising descriptions of one or more inserted malicious design alterations into target circuits to the terminal and/or client devices 201A-201N. Accordingly, such communications may be received and/or sent by the server(s) 206 from and/or to the terminal and/or client devices 201A-201N in various forms and via various methods.

The existing malicious design alteration storage device(s) 207 may be embodied as a data storage device such as a Network Attached Storage (NAS) device or devices, or as a separate server or servers. The existing malicious design alteration storage device(s) 207 may include data (e.g., information) accessed and stored by the server(s) 206 that may include existing malicious design alteration features to facilitate the operations of the malicious design alteration insertion system 205. Depending on the embodiment, such data may be stored in a variety of different data structures such as one or more files, databases, repositories, and/or the like. For example, the existing malicious design alteration storage device(s) 207 may include, without limitation, a plurality of trigger nets and payload nets and associated attributes, and/or the like.

In particular embodiments, a client device 201B-201N may be a mobile device, such as a smart phone or tablet, smart watch, or other wearable. Here, in some embodiments, the client device 201B-201N may execute an "app" to interact with the malicious design alteration insertion system 205. Such apps are typically designed to execute on mobile devices, such as tablets or smartphones. For example, an app may be provided that executes on mobile device operating systems such as Apple Inc.'s iOS®, Google Inc.'s Android®, or Microsoft Inc.'s Windows 10® (or other versions of these operating systems). These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications. Communication with hardware and software modules executing outside of the app is typically provided via application programming interfaces (APIs) provided by the mobile device operating system. Additionally or alternatively, a client device 201B-201N may interact with the malicious design alteration insertion system 205 via a web browser. As yet another example, a client device 201B-201N may include various hardware or firmware designed to interface with the malicious design alteration insertion system 205.

Exemplary Computing Entity

Figure 3:
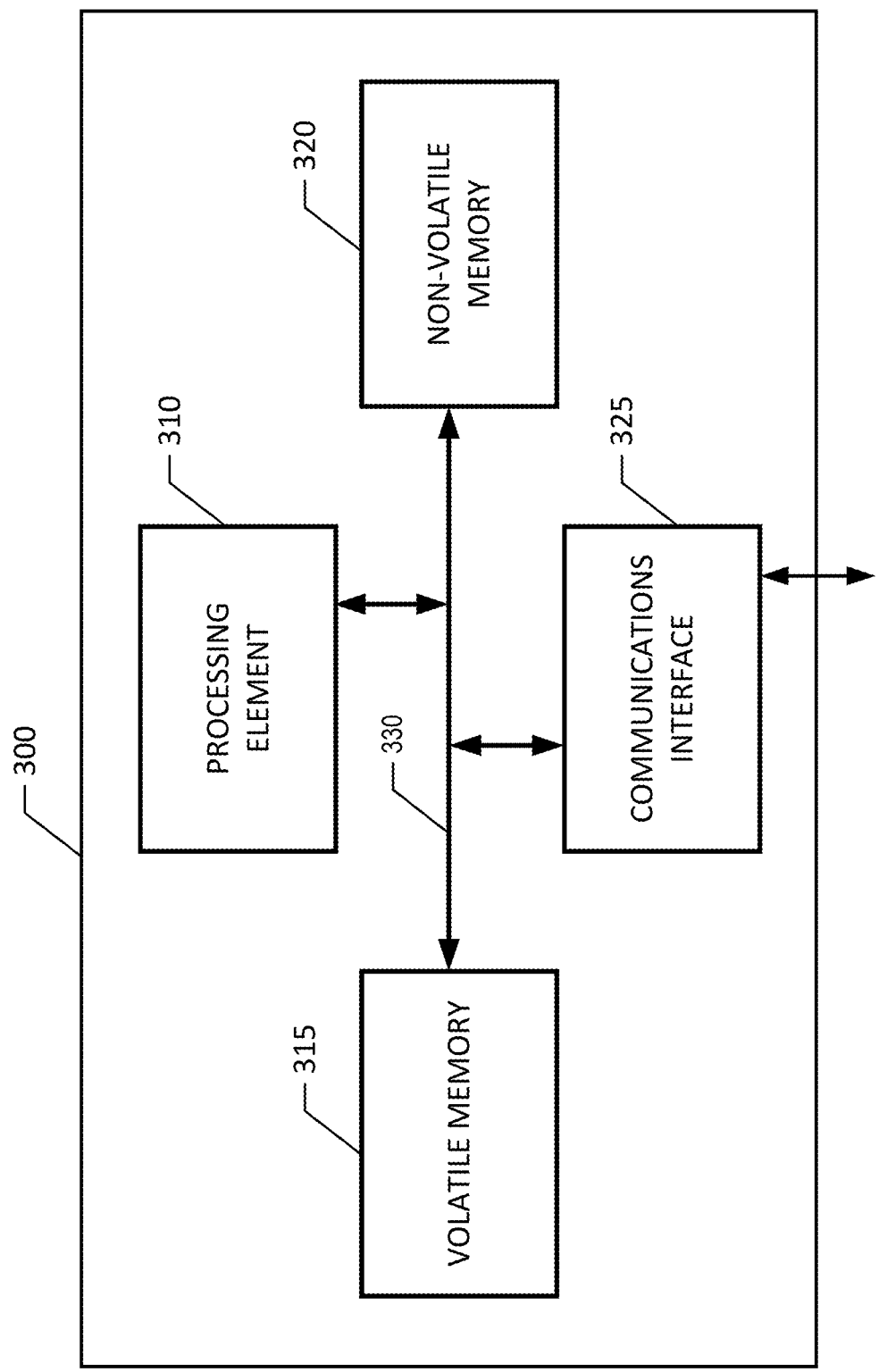
FIG. 3 is a schematic of a computing entity that may be used in accordance with various embodiments of the present disclosure.

FIG. 3 provides a schematic of a computing entity 300 that may be used in accordance with various embodiments of the present disclosure. For instance, the computing entity 300 may be one or more of the server(s) 206, terminal 201A, and/or client device(s) 201B-201N found within the system architecture 200 previously described in FIG. 2. In general, the terms computing entity, entity, device, system, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

Although illustrated as a single computing entity, those of ordinary skill in the art should appreciate that the computing entity 300 shown in FIG. 3 may be embodied as a plurality of computing entities, tools, and/or the like operating collectively to perform one or more processes, methods, and/or steps. As just one non-limiting example, the computing entity 300 may comprise a plurality of individual data tools, each of which may perform specified tasks and/or processes.

Depending on the embodiment, the computing entity 300 may include one or more network and/or communications interfaces 325 for communicating with various computing entities, such as by communicating data, content, information, and/or similar terms used herein interchangeably that can be transmitted, received, operated on, processed, displayed, stored, and/or the like. Thus, in certain embodiments, the computing entity 300 may be configured to receive data from one or more data sources and/or devices as well as receive data indicative of input, for example, from a device.

The networks used for communicating may include, but are not limited to, any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks. Further, the networks may have any suitable communication range associated therewith and may include, for example, global networks (e.g., the Internet), MANs, WANs, LANs, or PANs. In addition, the networks may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms provided by network providers or other entities.

Accordingly, such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the computing entity 300 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol. The computing entity 300 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

In addition, in various embodiments, the computing entity 300 includes or is in communication with one or more processing elements 310 (also referred to as processors, processing circuitry, and/or similar terms used herein interchangeably) that communicate with other elements within the computing entity 300 via a bus 330, for example, or network connection. As will be understood, the processing element 310 may be embodied in several different ways. For example, the processing element 310 may be embodied as one or more complex programmable logic devices (CPLDs), microprocessors, multi-core processors, coprocessing entities, application-specific instruction-set processors (ASIPs), and/or controllers. Further, the processing element 310 may be embodied as one or more other processing devices or circuitry. The term circuitry may refer to an entirely hardware embodiment or a combination of hardware and computer program products. Thus, the processing element 310 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 310 may be configured for a particular use or configured to execute instructions stored in volatile or non-volatile media or otherwise accessible to the processing element 310. As such, whether configured by hardware, computer program products, or a combination thereof, the processing element 310 may be capable of performing steps or operations according to embodiments of the present disclosure when configured accordingly.

In various embodiments, the computing entity 300 may include or be in communication with non-volatile media (also referred to as non-volatile storage, memory, memory storage, memory circuitry and/or similar terms used herein interchangeably). For instance, the non-volatile storage or memory may include one or more non-volatile storage or memory media 320 such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media 320 may store files, databases, database instances, database management system entities, images, data, applications, programs, program modules, scripts, source code, object code, byte code, compiled code, interpreted code, machine code, executable instructions, and/or the like. The term database, database instance, database management system entity, and/or similar terms used herein interchangeably and in a general sense to refer to a structured or unstructured collection of information/data that is stored in a computer-readable storage medium.

In particular embodiments, the memory media 320 may also be embodied as a data storage device or devices, as a separate database server or servers, or as a combination of data storage devices and separate database servers. Further, in some embodiments, the memory media 320 may be embodied as a distributed repository such that some of the stored information/data is stored centrally in a location within the system and other information/data is stored in one or more remote locations. Alternatively, in some embodiments, the distributed repository may be distributed over a plurality of remote storage locations only. As already discussed, various embodiments contemplated herein use data storage in which some or all the information/data required for various embodiments of the disclosure may be stored.

In various embodiments, the computing entity 300 may further include or be in communication with volatile media (also referred to as volatile storage, memory, memory storage, memory circuitry and/or similar terms used herein interchangeably). For instance, the volatile storage or memory may also include one or more volatile storage or memory media 315 as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media 315 may be used to store at least portions of the databases, database instances, database management system entities, data, images, applications, programs, program modules, scripts, source code, object code, byte code, compiled code, interpreted code, machine code, executable instructions, and/or the like being executed by, for example, the processing element 310. Thus, the databases, database instances, database management system entities, data, images, applications, programs, program modules, scripts, source code, object code, byte code, compiled code, interpreted code, machine code, executable instructions, and/or the like may be used to control certain aspects of the operation of the computing entity 300 with the assistance of the processing element 310 and operating system.

As will be appreciated, one or more of the computing entity's components may be located remotely from other computing entity components, such as in a distributed system. Furthermore, one or more of the components may be aggregated and additional components performing functions described herein may be included in the computing entity 300. Thus, the computing entity 300 can be adapted to accommodate a variety of needs and circumstances.

Exemplary System Operation

The functionality described herein may be carried out on a computing entity 300 such as the one previously described in FIG. 3. Accordingly, the computing entity 300 may carry out the functionality as logical operations and these logical operations may be implemented (1) as a sequence of computer implemented acts or one or more program modules running on the computing entity and/or (2) as interconnected machine logic circuits or circuit modules within the computing entity. The implementation is a matter of choice dependent on the performance and other requirements of the computing entity 300. Accordingly, the logical operations described herein are referred to variously as states, operations, structural devices, acts, or modules. These operations, structural devices, acts, and modules may be implemented in software, in firmware, in special purpose digital logic, and any combination thereof. Greater or fewer operations may be performed than shown in the figures and described herein. These operations may also be performed in a different order than those described herein.

Training Data Module

As previously discussed, the framework in various embodiments involves two phases: (1) trigger and payload model generation; and (2) Trojan insertion. Accordingly, in particular embodiments, the trigger and payload model generation phase of the framework involves developing one or more machine learning models that can then be used in the Trojan insertion phase. These machine learning models are trained on features extracted from Trojan examples representing ideal Trojan trigger nets and payload nets. However, before training the models, the features used as the training data must be extracted from the Trojan examples.

Therefore, turning now to FIG. 4, additional details are provided regarding a process flow for generating training data from Trojan examples according to various embodiments. FIG. 4 is a flow diagram showing a training data module for performing such functionality.

The process flow 400 begins in FIG. 4 with the training data module selecting a netlist for a Trojan example in Operation 410. Here, in particular embodiments, the netlist for the Trojan example may be stored along with netlists for other Trojan examples in a storage device 207 such as the one described in FIG. 2. Therefore, the feature extraction module may query the storage device 207 (e.g., database residing on the storage device 207) to retrieve the netlist for the Trojan example. In general, a netlist provides a description of the connectivity of an electronic circuit. The netlist may include a list of the electronic components that make up the Trojan provided in the example along with the nodes they are connected to. Accordingly, in various embodiments, the netlist is provided in a hardware description language such as Verilog or very high-speed integrated circuit hardware description language (VHDL). For example, the netlist may be a flattened Verilog gate-level netlist.

Next, the training data module extracts the features for each of the nets found in the selected netlist in Operation 415. In particular embodiments, the training data module performs this operation by invoking a feature extraction module. As discussed in further detail herein, the feature extraction module extracts the features for each of the nets found in the netlist for the selected Trojan example and returns the features for each of the nets to the training data module.

In turn, the training data module saves the features for each of the nets in a storage device 207 (e.g., a database) in Operation 420 so that they may be using for training the one or more machine learning models. Accordingly, the training data module may save the features along with other information (e.g., metadata) such as, for example, information identifying the corresponding Trojan (e.g., Trojan example) for the features and/or information identifying whether the features have been extracted from a net serving as a trigger net for the Trojan or a payload net for the Trojan.

At this point, the training data module determines whether a netlist for another Trojan example is available in Operation 425. If so, then the training data module returns to operation 410, selects the netlist for the next Trojan example, and extracts the features for each of the nets found in the netlist as described above. Once the training data module has processed all of the netlists for the Trojan examples, the module exits. As a result, training data is produced from the Trojan examples that can be used in training the machine learning models described herein.

Feature Extraction Module

Turning now to FIG. 5, additional details are provided regarding a process flow for extracting the features of nets found in a netlist according to various embodiments. FIG. 5 is a flow diagram showing a feature extraction module for performing such functionality according to various embodiments of the disclosure. As previously mentioned, the feature extraction module may be invoked by another module in particular embodiments to extract the features such as, for example, the training data module previously described. However, with that said, the feature extraction module may not necessarily be invoked by another module and may execute as a stand-alone module in other embodiments.

The process flow 500 begins with the feature extraction module converting the netlist to a hypergraph representation in Operation 510. A hypergraph is a generalization of a graph in which an edge can join any number of vertices, as in contrast to in an ordinary graph where an edge connects exactly two vertices. Once in this form, the feature extraction module in various embodiments selects an edge (e.g., a net) and extracts the functional and/or structural features from the edge (e.g., the net) in Operations 515 and 520.

Generally speaking, functional features are related to the functional behavior of the net or its driving logic. Structural features describe the location and connectivity information of the net. Accordingly, structural features can provide useful information in particular embodiments when used together with functional features. In some embodiments, the feature extraction module is configured to calculate one or more of the structural features through breadth-first search and depth-first search graph traversal algorithms. Accordingly, Table 1 provides a list of features that may be extracted from a net in various embodiments.

TABLE 1

List of Features

| Feature | Description | Type |
|---|---|---|
| Signal Probability | Static signal probability of the net | Functional |
| Toggle Rate | Toggle rate of the Net | Functional |
| Entropy | Entropy of the cell driving the net | Functional |
| Controllability | Controllability of the net | Functional |
| Observability | Observability of the net | Functional |
| Fanin Level 1 | # of connected inputs to the net at level 1 | Structural |
| Fanout Level 1 | # of connected outputs from the net at level 1 | Structural |
| Fanin Level 2 | # of connected inputs to the net at level 2 | Structural |
| Fanout Level 2 | # of connected outputs from the net at level 2 | Structural |
| Nearest_FF_D | Distance of the nearest flip-flop input from the net | Structural |
| Nearest_FF_Q | Distance of the nearest flip-flop output from the net | Structural |
| Min. PI Distance | Minimum distance from the nearest primary Input | Structural |
| Min. PO Distance | Minimum distance from the nearest primary output | Structural |

Signal probability denotes the fraction of time the state of the signal or net is expected to be at logic-1. Static probability of 0.4 indicates that 40% of the time the net is expected to be at logic-1. Rarely switching Trojan nets typically have nets with very low or very high signal probability. Various embodiments support signal probability calculation through both simulation and transition probability calculation assuming full-scan implementation.

Toggle rate (also referred to as transition rate) is the number of transitions with respect to the clock input. For instance, if the signal toggles three times every four clock cycle, then the toggle rate is 3/4=0.75 (could also be reported as 75%). Hard-to-activate Trojans are often likely to contain nets with very low toggle rates.

Entropy of a net is the measure of balance in the number of zeros and ones in the truth table of the driving gate. If the probability of 1 and 0 in the output column of a truth table is $P_1$ and $P_0$ respectively, then the feature exaction module in various embodiments calculates the entropy of a gate as:

$$E = P_1 \log_2 \frac{1}{P_1} + P_0 \log_2 \frac{1}{P_0}$$

The entropy of a gate provides various aspects regarding its functional behavior. For instance, if the output column of the truth table mostly contains zeros, then the functionality of the corresponding gate resembles to an AND function. Even though an attacker can construct the same malicious functionality with different types of gate structures to bypass identification, the underlying behavior of the logic should be the same when observed using such functional features.

Controllability represents the difficulty of assigning a net to the desired logic value by applying vectors to the primary inputs. To design a Trojan that is hard to activate during logic testing, an attacker often designs the trigger mechanism using nets with low controllability. To calculate combinational controllabilities of each net, the primary inputs are assumed to have controllability of 1 and design is considered as a full-scan design. Accordingly, in particular embodiments, the feature extraction module traverses the graph representation in breadth-first order from inputs to primary outputs while calculating controllability of each gate.

Observability represents the difficulty of propagating the logic state of a net to observable points (e.g., primary outputs, scan flops). To further hide the Trojan, the corresponding payload could be designed to impact only low observability nodes. For full-scan design, combinational observability of each net is obtained in various embodiments by assuming obeservability of primary outputs as 0 and traversing backwards to primary inputs while calculating the observability of input net as a function of output net observability and input net controllability.

Fanin is useful in understanding if a net is driven by a logic with a large fanin structure. Level 1 fanin of a net represents the number of nets that are input to the cell driving the net. Level 2 fanin indicates the total fanin of those nets that are Level 1 input to the cell. Level 1 fanout represents the number of cells the net is propagating to. A Trojan circuit usually provides output to the original design through the payload only. Fanout of gates in the logic cone of a trigger circuit usually goes as inputs to other gates in the trigger logic. Hence, the fanout of Trojan nets is likely to be low. Even for always-on Trojans using ring-oscillators or shift-registers, the fanout of the nets typically do not propagate to the normal part of the design.

Combinational and sequential Trojans are considered in various embodiments as two different classes of Trojans and their training and testing process may be separated. Since sequential Trojan nets are expected to have flip-flops in close locations unlike combinational Trojan nets, particular embodiments use the distance from the nearest flop-flop as features (e.g., Nearest_FF_D and Nearest_FF_Q). While these features can help a trained model for sequential Trojans to detect sequential Trojan nets in a suspect IP, these features can also prevent the model from classifying combinational Trojan nets in the suspect IP as nets sequential Trojans.

Distance from primary input (PI) can provide more context to various functional features. For instance, Trojans that take the trigger values directly from the PIs may have higher toggle rates compared to Trojans that take trigger inputs from very rare signals. However, the toggle rate could be rarer when compared to other non-Trojan nets with similar shorter distance from the PIs. Distance from primary output (PO) is useful for identifying malicious structures that require them to be situated near the PO (e.g., Trojans that leak information through the PO). Since flip-flops are usually connected to clock, reset, and enable signals directly coming from the PI, various embodiments of the feature extraction module are configured to only consider the D-input when calculating the distance from PI.

In particular embodiments, the feature extraction module may be configured to calculate the relative value for one or more of the features. In these particular embodiments, each net's feature value may be updated with the distance between the net's feature value and the average feature value across all nets. In this way, the training process can be agnostic to the benchmarks provided in the training data and the features of the Trojan can be captured with respect to the overall benchmark.

Once the feature extraction module has extracted the features for the net, the module determines whether another net exists for the netlist in Operation 525. If so, then the feature extraction module returns to Operation 515, selects the next net for the netlist, and extracts the features for the newly selected net. Once the feature extraction module has processed all of the nets for the netlist, the module exits.

Machine Learning Models

In various embodiments, a Gaussian Mixture Model (GMMs) is used to estimate the mean ($\mu \in R^k$) of each mixture component and the co-variance matrix ($\Sigma \in R^{k*k}$) of each mixture component thereby approximating the data distribution given the training samples. In addition, variational Bayesian estimation is used for finding out the number of components based on the data. Although it should be understood by those of ordinary skill in the art that other machine learning approaches (e.g., other generative models) can be used in other embodiments such as, for example, Hidden Markov Models (HMM) and Generative Adversarial Networks(GAN), as well as various search algorithms. Here, an Expectation—maximization algorithm is used to fit the Bayesian Gaussian Mixture Models for representing the Trojan trigger and payload distributions that are to be mimicked.

Accordingly, in these embodiments, two Gaussian mixture models are developed representing the Trojan trigger and payload net population, respectively. Although those of ordinary skill in the art should understand that in other embodiments a single model may be developed and used or more than two models may be developed and used. A process 600 for training the models is show in FIG. 6 according to various embodiments. As already discussed, feature extraction 620 may be carried out on the nets 615 from a set of known Trojans 610 (e.g., Trojan examples) to compile a dataset of features 625. Accordingly, the dataset of features may then be labeled 630 to identify those nets (and corresponding features) in the dataset belonging to Trojans and those that do not. This labeled dataset 635 may then be used in training 640 the models 645. Thus, in various embodiments, the training of the models involves learning the parameters of a set of finite number of Gaussian distributions which can approximately represent the training dataset. Once the models are trained, Trojan trigger and payload nets (in form of their features) can be sampled to generate required Trojans as described further herein. Thus, in various embodiments, the models are representative of the Trojan examples used that contain information about the types of Trojans present in the circuits contained in the examples. Therefore, in particular instances, it may be more appropriate to generate several different virtual models to more accurately represent different Trojan classes, e.g., combinational, sequential, always on, etc. Therefore, various embodiments support existence and generation of multiple trained models which can be specified by the user. Consequently, in various embodiments, the Trojan population can be generated offline and is typically updated only if there are additions to the original database.

It is important to note that in some instances the training of the models is only carried out at the start before the Trojan insertion phase of the framework is performed in various embodiment. Accordingly, after the machine learning models have been trained, they can be stored and reused as is in some embodiments, without any further computation. Not only can this prevent computational overhead, it can also provide a user with more control over the functioning of the tool. For instance, the user can choose to supply the trained machine learning model directly, without having to supply the set of Trojan examples. This can be particularly useful if the set of examples is extremely large and the training phase can be carried out more efficiently on separate infrastructure.

Trojan Insertion Module

In various embodiments, the process for Trojan insertion involves the use of the two machine learning models described herein for trigger and payload nets, respectfully, a netlist for a target circuit (in which the Trojan is to be inserted), and a malicious design alteration design (e.g., user-supplied Trojan design or a Trojan template). Accordingly, in particular embodiments, a process 700 involving the steps shown in FIG. 7 may be performed to generate an insertion netlist configured for inserting a malicious design alteration into a target circuit.

With this process 700 in mind, turning now to FIG. 8, additional details are provided regarding a process flow for generating an insertion netlist for a target circuit configured for inserting a malicious design alteration (e.g., a Trojan) into the target circuit based on a malicious design (e.g., a Trojan template) according to various embodiments. FIG. 8 is a flow diagram showing a Trojan insertion module for performing such functionality.

The process flow 800 begins in FIG. 8 with the Trojan insertion module receiving the netlist for the target circuit in Operation 810. The Trojan insertion module then extracts the features of the nets found in the netlist for the target circuit in Operation 815. Here, in particular embodiments, the Trojan insertion module invokes the feature extraction module previously discussed. In turn, the feature extraction module extracts the features for each of the nets found in the netlist and provides the features to the Trojan insertion module.

In addition, the Trojan insertion module receives a template for the Trojan to be inserted into the target circuit in Operation 820. In particular instances, the module may receive a user-supplied Trojan design in lieu of the template. In particular embodiments, the template identifies the type of Trojan to be inserted into the target circuit. In addition, the template identifies the number of trigger nets and/or payload nets for the Trojan. The Trojan insertion module then converts the template to a hypergraph representation in Operation 825. Further, the Trojan insertion module generates reference payload features for the malicious design alteration found in the Trojan template in Operation 830. Accordingly, in various embodiments, the Trojan insertion module performs this particular operation by sampling the machine learning payload model and the model provides a set of reference payload features (e.g., vector of features) identifying the features a net in the target circuit should ideally have to be used as a payload net for the Trojan to be inserted in the target circuit. For instance, in particular embodiments, sampling the machine learning payload model entails invoking the trained model (e.g., like a function) to output a representative N feature sample. For example, a machine learning payload model may be trained on ten features from thousands of existing Trojan payload nets, and sampling the model produces a new ten feature vector with values similar those of the training features. The machine learning trigger model may be configured in a similar fashion.

Therefore, the Trojan insertion module generates reference trigger features for the malicious design alteration found in the Trojan template in Operation 835. Here, in particular embodiments, the Trojan insertion module performs this operation by sampling the machine learning trigger model and the model provides a set of reference trigger features identifying the features a net in the target circuit should ideally have to be used as a trigger net for the Trojan to be inserted in the target circuit. Accordingly, in some embodiments, the Trojan insertion module is configured to sample the machine learning payload model and/or the machine learning trigger model a number of times matching the number of payload nets and/or trigger nets found in the template for the Trojan to be inserted into the target circuit. For example, if the Trojan to be inserted into the target circuit has two trigger nets, then the machine learning trigger model is sampled twice.

At this point, the Trojan insertion module uses the reference features to identify potential trigger and payload nets found in the target circuit that may be used for inserting the Trojan into the target circuit. Therefore, in particular embodiments, the Trojan module initially sorts the nets found in the target circuit based on a similarity of the features of each net to the reference features in Operation 840. In particular embodiments, the Trojan insertion module performs this particular operation by invoking a sorting module. As described in further detail herein, the sorting module sorts the nets found in the target circuit into one or more lists based on a similarity of the features of each net to the reference features. Once sorted, the Trojan insertion module selects the required number of nets from the sorted list(s) to use as trigger and payload nets for inserting the Trojan into the target circuit in Operation 845. In particular embodiments, the Trojan insertion module performs this particular operation by invoking a selection module and the selection module identifies the nets found in the target circuit for the trigger and payload nets needed for the Trojan to be inserted into the target circuit.

Once the trigger nets have been selected, various embodiments of the Trojan insertion module are configured to check whether the selected trigger nets can achieve the combination of values required to activate the Trojan. Accordingly, failure to perform this check in particular instances can lead to the formation of a "dead" Trojan (e.g., a Trojan that is present in the circuit but never triggers). Therefore, the Trojan insertion module determines whether the selected trigger nets are valid in Operation 850.

For example, turning briefly to FIG. 9, a Trojan 900 that is to be inserted into a target circuit 910 is shown. A check is performed as to whether n2 915 and n3 920 can activate the Trojan 900. In this case, the check is equivalent to determining whether nets n2 915 and n3 920 can both take value 1 (Boolean High) simultaneously.

Returning to FIG. 8, in particular embodiments, the Trojan insertion module may be configured to use a functional verification platform such as, for example, Cadence Incisive Formal Verifier (IFV) and/or Onespin to perform the verification check. In other embodiments, other tools may be used such as formal or automatic test pattern generation (ATPG) computer-aided design (CAD). If every trigger net can simultaneous achieve the required value, then the selection of nets is deemed valid. On the other hand, if some nets cannot achieve the required value, then the Trojan insertion module returns to Operation 845 and identifies another set of nets that can be used in inserting the Trojan into the target circuit.

Once a valid set of nets have been identified, the Trojan insertion module generates an insertion netlist that can be used in inserting the Trojan into the target circuit base on the identified set of nets to be used as the trigger and payload nets for the Trojan. In addition, in particular embodiments, the Trojan insertion module generates a report that provides a description of the Trojan. As a result, the netlist can then be used in inserting the Trojan identified in the template into the target circuit.

As previously noted, various embodiments allow for insertion of user-supplied Trojan designs to provide maximum flexibility. In addition, various embodiments can make use of a library of Trojan templates to "plug-in" the trigger and payload nets for ease of use. For example, in particular embodiments, there may be three types of "plug-in" Trojans present in the template library: denial-of-service, functional leakage, and side-channel leakage Trojans.

Denial-of-service Trojans disrupt the execution of the IP under some rare condition. There are two sub-types of Trojans in this class: combinational and sequential. The combinational Trojan typically includes a set of trigger nets connected to the Trojan body which is purely combinational. Depending on the embodiment, the payload of the Trojan may either be specified by the user or may be chosen from the model generated by the Trojan insertion module. The sequential Trojan is similar in nature except that the Trojan body contains sequential elements or a FSM. Example templates 1000, 1010 for combinational and sequential DoS Trojans are shown in FIG. 10.

Functional leakage Trojans seeks to leak secret information in the circuit through the primary outputs of the circuit. The Trojan taps a user specified secret in the design and connects it to the primary output through a behavioral multiplexer. The select bit of the multiplexer is controlled by a triggering mechanism which can be either combinational or sequential. In particular embodiments, the templates may include MUX gates in addition to AND/OR equivalent compositions to increase structural diversity. An example functional leakage templates 1015 is shown in FIG. 10.

Finally, side-channel leakage Trojans leak secret information about the design through various side-channels such as power and electromagnetic radiations. For example, in particular embodiments, ring oscillator and MOLES-based templates may be available. These Trojan templates may tap user specified secret net(s) to create the side-channel signature that leaks the information. An example ring oscillator template 1020 is also shown in FIG. 10.

Sorting Module

Turning now to FIG. 11, additional details are provided regarding a process flow for sorting the nets found in a target circuit with respect to reference features according to various embodiments. FIG. 11 is a flow diagram showing a sorting module for performing such functionality according to various embodiments of the disclosure. As previously mentioned, the sorting module may be invoked by another module in particular embodiments to sort the nets such as, for example, the Trojan insertion module previously described. However, with that said, the sorting module may not necessarily be invoked by another module and may execute as a stand-alone module in other embodiments.

The process flow 1100 begins with the sorting module selecting a set of reference features for the reference type in Operation 1110. Here, in particular embodiments, the reference types includes payload and/or triggers nets. As previously mentioned, in various embodiments, the machine learning model(s) (e.g., payload and/or trigger models) may be sampled for each payload and/or trigger net needed to insert the Trojan into the target circuit. For example, if two trigger nets are needed to insert the Trojan into the target circuit, then the machine learning trigger model is sampled twice to produce to sets of reference trigger features, one set for each trigger net. Therefore, in this example, the sorting module selects one of the two sets of reference features.

The sorting module then creates a sort list for the set of reference features that includes each net found in the netlist for the target circuit sorted based on a similarity of the extracted features for each net with the set of reference features in Operation 1115. For instance, in particular embodiments, the sorting module may be configured to sort the nets based on a distance measure such as an Euclidean distance, a Manhattan distance, a Minkowski distance, a Chebyshev distance, and/or the like. Accordingly, in these particular embodiments, the sorting module calculates the distance between the extracted features for each net and the set of reference features and uses the distances to sort the nets in the list accordingly.

At this point, the sorting module determine whether another set of reference features exists for the reference type in Operation 1120. If so, the sorting module returns to Operation 1110, selects the next set of reference features and creates a sort list for the newly selected set of reference features as just described. Once the sorting module has created a sort list for each set of reference features, the module exits.

Selection Module

Turning now to FIG. 12, additional details are provided regarding a process flow for identifies the nets found in a target circuit for the trigger and payload nets needed for a Trojan to be inserted into the target circuit according to various embodiments. FIG. 12 is a flow diagram showing a selection module for performing such functionality according to various embodiments of the disclosure. As previously mentioned, the selection module may be invoked by another module in particular embodiments to identify the nets such as, for example, the Trojan insertion module previously described. However, with that said, the selection module may not necessarily be invoked by another module and may execute as a stand-alone module in other embodiments.

The process flow 1200 begins with the selection module selecting a sort list for one of the set of reference features in Operation 1210. Once selected, the selection module selects a net from the list that is within a threshold in Operation 1215. In particular embodiments, the threshold is used to identify the level of similarity required between the features of the selected net and the set of reference features. Therefore, in some embodiments, the threshold may identify a threshold distance for the similarity of the features of the selected net must have with respect to the set of reference features. In addition, in some embodiments, the selection module may be configured to make a random selection of one of the nets within the threshold.

The selection module then determines whether a net is to be selected for another set of reference features in Operation 1220. If so, then the selection module returns to Operation 1210, selects the sort list for the next set of reference features, and selects a net for the set of reference features as just described.

In particular embodiments, the summation of rankings for the selected nets must be below a second threshold. Therefore, in these particular embodiments, once a net has been selected for each of the sets of reference features, then the selection module determines whether a summation of the indices (the rankings of the nets in the sort lists) is below a second threshold in Operation 1225. If not, then the selection module returns to Operation 1210 and starts the process flow 1200 over again for selecting a net for each set of reference features.

In particular embodiments, the thresholds can be experimentally determined and/or to set/modified through user input. Accordingly, these thresholds are put into place in various embodiments to allow for variation in trigger and payload net population while also constraining selection to more appropriate nets. In addition, various embodiments can provide the option to iteratively relax the constraint if the conditions cannot be met. By selecting nets with features similar to the reference features as trigger and payload nets, embodiments of the present disclosure can ensure generated Trojans have characteristics that mimic the sampled Trojans used for training.

CONCLUSION

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method for generating an insertion netlist for a target circuit configured for inserting a malicious design alteration into the target circuit based at least in part on a malicious design identifying one or more reference trigger nets for the malicious design alteration, the computer-implemented method comprising:
   extracting one or more features for each of one or more nets identified in a netlist for the target circuit;
   generating a set of reference trigger features for each of the one or more reference trigger nets identified in the malicious design by using a machine learning trigger model;
   for each of the sets of reference trigger features, selecting a selected trigger net from the one or more nets identified in the netlist for the target circuit based at least in part on a similarity between the one or more features for each of the one or more nets identified in the netlist for the target circuit and the set of reference trigger features;
   determining the selected trigger nets are valid; and
   generating the insertion netlist comprising the target circuit with the malicious design alteration inserted into the target circuit at each of the selected trigger nets.

2. The computer-implemented method of claim 1, wherein the malicious design identifies one or more reference payload nets for the malicious design alteration and the method further comprises:
   generating a set of reference payload features for each of the one or more reference payload nets identified in the malicious design by using a machine learning payload model; and
   for each of the sets of reference payload features, selecting a selected payload net from the one or more nets identified in the netlist for the target circuit based at least in part on a similarity between the one or more features for each of the one or more nets identified in the netlist for the target circuit and the set of reference payload features, and the insertion netlist comprises the target circuit with the malicious design alteration inserted into the target circuit at each of the selected trigger nets and each of the selected payload nets.

3. The computer-implemented method of claim 1, wherein the malicious design alteration comprises a hardware Trojan.

4. The computer-implemented method of claim 2, wherein the machine learning trigger model and the machine learning payload model each comprise a machine-based learning model that is trained on features extracted from a plurality of trigger nets and a plurality of payload nets for a plurality of malicious design alteration examples.

5. The computer-implemented method of claim 1, wherein the one or more features for each of the one or more nets identified in the netlist for the target circuit comprises at least one of one or more functional features related to functional behavior of the net and one or more structural features describing location and connectivity of the net.

6. The computer-implemented method of claim 5 further comprising generating a hypergraph representation of the netlist for the target circuit, wherein extracting the one or more features for each of the one or more nets identified in the netlist comprises calculating the one or more structural features through use of at least one of a breadth-first search graph traversal algorithm and a depth-first search graph traversal algorithm on the hypergraph representation.

7. The computer-implemented method of claim 1, wherein selecting the selected trigger net for each of the sets of reference trigger features from the one or more nets identified in the netlist for the target circuit comprises:
   for each of the sets of reference trigger features, generating a sorted trigger list comprising the one or more nets identified in the netlist for the target circuit, wherein the sorted trigger list comprises the one or more nets sorted in order based at least in part on the similarity between the one or more features for a net of the one or more nets and the set of reference trigger features; and
   for each sorted trigger list, randomly selecting one of the one or more nets from the sorted trigger list as the selected trigger net based at least in part on the selected trigger net being ordered in the sorted trigger list within a threshold.

8. The computer-implemented method of claim 1, wherein the similarity between the one or more features for each of the one or more nets and the set of reference trigger features is based at least in part on a distance between the one or more features for each of the one or more nets and the set of reference trigger features.

9. An apparatus for generating an insertion netlist for a target circuit configured for inserting a malicious design alteration into the target circuit based at least in part on a malicious design identifying one or more reference trigger nets for the malicious design alteration, the apparatus comprising at least one processor and at least one memory including a computer program code, the at least one memory and the computer program code configured to, with the at least one processor, cause the apparatus to:
   extract one or more features for each of one or more nets identified in a netlist for the target circuit;
   generate a set of reference trigger features for each of the one or more reference trigger nets identified in the malicious design by using a machine learning trigger model;
   for each of the sets of reference trigger features, select a selected trigger net from the one or more nets identified in the netlist for the target circuit based at least in part on a similarity between the one or more features for each of the one or more nets identified in the netlist for the target circuit and the set of reference trigger features;
   determine the selected trigger nets are valid; and
   generate the insertion netlist comprising the target circuit with the malicious design alteration inserted into the target circuit at each of the selected trigger nets.

10. The apparatus of claim 9, wherein the malicious design identifies one or more reference payload nets for the malicious design alteration and the at least one memory and the computer program code are configured to, with the at least one processor, cause the apparatus to:

generate a set of reference payload features for each of the one or more reference payload nets identified in the malicious design by using a machine learning payload model; and for each of the sets of reference payload features, select a selected payload net from the one or more nets identified in the netlist for the target circuit based at least in part on a similarity between the one or more features for each of the one or more nets identified in the netlist for the target circuit and the set of reference payload features, and the insertion netlist comprises the target circuit with the malicious design alteration inserted into the target circuit at each of the selected trigger nets and each of the selected payload nets.

11. The apparatus of claim 9, wherein the malicious design alteration comprises a hardware Trojan.

12. The apparatus of claim 10, wherein the machine learning trigger model and the machine learning payload model each comprise a machine-based learning model that is trained on features extracted from a plurality of trigger nets and a plurality of payload nets for a plurality of malicious design alteration examples.

13. The apparatus of claim 9, wherein the one or more features for each of the one or more nets identified in the netlist for the target circuit comprises at least one of one or more functional features related to functional behavior of the net and one or more structural features describing location and connectivity of the net.

14. The apparatus of claim 13, wherein the at least one memory and the computer program code are configured to, with the at least one processor, cause the apparatus to generate a hypergraph representation of the netlist for the target circuit, and the at least one memory and the computer program code are configured to, with the at least one processor, cause the apparatus to extract the one or more features for each of the one or more nets identified in the netlist by calculating the one or more structural features through use of at least one of a breadth-first search graph traversal algorithm and a depth-first search graph traversal algorithm on the hypergraph representation.

15. The apparatus of claim 9, wherein the at least one memory and the computer program code are configured to, with the at least one processor, cause the apparatus to select the selected trigger net for each of the sets of reference trigger features from the one or more nets identified in the netlist for the target circuit by:

for each of the sets of reference trigger features, generating a sorted trigger list comprising the one or more nets identified in the netlist for the target circuit, wherein the sorted trigger list comprises the one or more nets sorted in order based at least in part on the similarity between the one or more features for a net of the one or more nets and the set of reference trigger features; and for each sorted trigger list, randomly selecting one of the one or more nets from the sorted trigger list as the selected trigger net based at least in part on the selected trigger net being ordered in the sorted trigger list within a first threshold.

16. The apparatus of claim 9, wherein the similarity between the one or more features for each of the one or more nets and the set of reference trigger features is based at least in part on a distance between the one or more features for each of the one or more nets and the set of reference trigger features.

17. A non-transitory computer storage medium comprising instructions for generating an insertion netlist for a target circuit configured for inserting a malicious design alteration into the target circuit based at least in part on a malicious design identifying one or more reference trigger nets for the malicious design alteration, the instructions being configured to cause one or more processors to at least perform operations configured to:

extract one or more features for each of one or more nets identified in a netlist for the target circuit;

generate a set of reference trigger features for each of the one or more reference trigger nets identified in the malicious design by using a machine learning trigger model;

for each of the sets of reference trigger features, select a selected trigger net from the one or more nets identified in the netlist for the target circuit based at least in part on a similarity between the one or more features for each of the one or more nets identified in the netlist for the target circuit and the set of reference trigger features;

determine the selected trigger nets are valid; and generate the insertion netlist comprising the target circuit with the malicious design alteration inserted into the target circuit at each of the selected trigger nets.

18. The non-transitory computer storage medium of claim 17, wherein the malicious design identifies one or more reference payload nets for the malicious design alteration and the instructions are configured to cause the one or more processors to at least perform operations configured to:

generate a set of reference payload features for each of the one or more reference payload nets identified in the malicious design by using a machine learning payload model; and for each of the sets of reference payload features, select a selected payload net from the one or more nets identified in the netlist for the target circuit based at least in part on a similarity between the one or more features for each of the one or more nets identified in the netlist for the target circuit and the set of reference payload features, and the insertion netlist comprises the target circuit with the malicious design alteration inserted into the target circuit at each of the selected trigger nets and each of the selected payload nets.

19. The non-transitory computer storage medium of claim 17, wherein the malicious design alteration comprises a hardware Trojan.

20. The non-transitory computer storage medium of claim 18, wherein the machine learning trigger model and the machine learning payload model each comprise a machine-based learning model that is trained on features extracted from a plurality of trigger nets and a plurality of payload nets for a plurality of malicious design alteration examples.

21. The non-transitory computer storage medium of claim 17, wherein the one or more features for each of the one or more nets identified in the netlist for the target circuit comprises at least one of one or more functional features related to functional behavior of the net and one or more structural features describing location and connectivity of the net.

22. The non-transitory computer storage medium of claim 21, wherein the instructions are configured to cause the one or more processors to at least perform operations configured to generate a hypergraph representation of the netlist for the target circuit, and the instructions are configured to cause the one or more processors to at least perform operations configured to extract the one or more features for each of the one or more nets identified in the netlist by calculating the one or more structural features through use of at least one of a breadth-first search graph traversal algorithm and a depth-first search graph traversal algorithm on the hypergraph representation.

23. The non-transitory computer storage medium of claim 17, wherein the instructions are configured to cause the one or more processors to at least perform operations configured to select the selected trigger net for each of the sets of reference trigger features from the one or more nets identified in the netlist for the target circuit by:

for each of the sets of reference trigger features, generating a sorted trigger list comprising the one or more nets identified in the netlist for the target circuit, wherein the sorted trigger list comprises the one or more nets sorted in order based at least in part on the similarity between the one or more features for a net of the one or more nets and the set of reference trigger features; and for each sorted trigger list, randomly selecting one of the one or more nets from the sorted trigger list as the selected trigger net based at least in part on the selected trigger net being ordered in the sorted trigger list within a first threshold.

24. The non-transitory computer storage medium of claim 17, wherein the similarity between the one or more features for each of the one or more nets and the set of reference trigger features is based at least in part on a distance between the one or more features for each of the one or more nets and the set of reference trigger features.

* * * * *